United States Patent [19]
Elliott et al.

[11] Patent Number: 5,721,917
[45] Date of Patent: Feb. 24, 1998

[54] SYSTEM AND METHOD FOR DETERMINING A PROCESS'S ACTUAL WORKING SET AND RELATING SAME TO HIGH LEVEL DATA STRUCTURES

[75] Inventors: Ian A. Elliott; David R. Lechtenberg; James M. Stearns; Alan D. Ward, all of Fort Collins, Colo.

[73] Assignee: Hewlett-Packard Company, Palo Alto, Calif.

[21] Appl. No.: 380,166

[22] Filed: Jan. 30, 1995

[51] Int. Cl.[6] .................................................. G06F 7/00
[52] U.S. Cl. ........................... 395/618; 395/671; 364/264; 364/264.3; 364/280; 364/280.6
[58] Field of Search ........................ 395/650, 700, 395/618, 671, 675; 364/264, 264.3, 280, 280.3

[56] References Cited

U.S. PATENT DOCUMENTS

| | | | |
|---|---|---|---|
| 4,730,249 | 3/1988 | O'Quin, II et al. | 364/200 |
| 4,758,944 | 7/1988 | Bartley et al. | 364/200 |
| 4,761,737 | 8/1988 | Duvall et al. | 364/300 |
| 4,989,134 | 1/1991 | Shaw | 364/200 |
| 5,055,999 | 10/1991 | Frank et al. | 364/200 |
| 5,086,386 | 2/1992 | Islam | 395/600 |
| 5,101,485 | 3/1992 | Perazzoli, Jr. | 395/400 |
| 5,237,673 | 8/1993 | Orbits et al. | 395/425 |
| 5,247,687 | 9/1993 | Eilert et al. | 395/775 |
| 5,263,032 | 11/1993 | Porter et al. | 371/40.2 |
| 5,517,643 | 5/1996 | Davy | 395/650 |

Primary Examiner—Kevin A. Kriess
Assistant Examiner—Majid Banankhah

[57] ABSTRACT

An interactive, information logging and processing tool that provides information regarding a process's data structure utilization to reduce the working set of a process's dynamically allocated memory. The actual working set (AWS) determinant determines which portions of the dynamically-allocated pages, referred to as the process's virtual memory (VM) working set (VWS) are actually used. It then determines the actual working set of a dynamically allocated memory for a given benchmark. The basic approach of the AWS determinator is to observe which data structures cause page faults when the targeted process is severely thrashing. AWS determinator includes a data logger and a data analyzer. The data logger ensures that a consistent benchmark is achieved in order to obtain the most accurate results, increases the number and granularity of heap page faults for the target process to enable the page fault mechanism of the processor to count the number of times the associated data structure is accessed, and log all heap page faults and transactions. The data analyzer is an interactive, information processing tool that efficiently process the large amounts of data logged by the data logger during a benchmark run. The data analyzer also allows users to interactively explore the processed data, to gain insights into a process's heap AWS. The data analyzer correlates each block of heap memory to a particular C data structure. Then, after the benchmark is completed and the above information is logged and correlated, an information processing step is performed wherein an approximate determination of the targeted process's heap AWS is performed.

17 Claims, 12 Drawing Sheets

SYSTEM AND METHOD FOR DETERMINING A PROCESS'S ACTUAL WORKING SET AND RELATING SAME TO HIGH LEVEL DATA STRUCTURES

BACKGROUND OF THE INVENTION

1. Field of the Invention

The present invention relates generally to the management of virtual memory in a multitasking environment and, more particularly, to a system and method for reducing RAM requirements of a process's working set.

2. Related Art

Over the years, system RAM requirements have grown exponentially. For example, the original PDP-11 minicomputers ran UNIX with only 64 KBytes of RAM. Some of the early workstations were hard-limited to a maximum of 2 MBytes. These days, entry-level workstations with 16 MBytes may seem sluggish when running modern desktop software.

One conventional approach is to simply to dismiss memory tuning as unnecessary and add additional RAM. After all, RAM prices continue to fall. However, system prices also continue to fall. Given the relative ratios of RAM requirement increases, RAM price reductions, and system price reductions, RAM continues to represent a significant portion of system cost. In addition, in today's competitive environment, if one set of software requires more RAM, and as such, requires a more expensive system than another set of software, sales of the former may suffer.

Conventional solutions have primarily focused on improving virtual memory paging algorithms. Examples may be found in Gupta & Franklin, *IEEE Transactions on Computers* C-27:706–712 (1978); Levy & Lipman, *Computer* 15:35–41 (1982); and Loren & Deitel, *Operating Systems*, Addison Wesley, Reading, Mass. (1981). While these improvements are important in that they enable a large program run more efficiently, they do not take the continual growth in memory usage into consideration. Thus, even with the most advanced paging algorithm, the system RAM requirements continue to increase as the processes continue to grow.

However, while much of this extra RAM is consumed by additional functionality, much of it is simply wasted as a result of poor programming practices. Memory tuning efforts directed towards reclaiming the wasted RAM have used various techniques with mixed success. This lack of success has been attributed to the inability of these conventional systems to provide the memory tuner insight regarding what makes up the working set of a particular process.

What is needed, therefore, is a system which enables a memory tuner to reclaim wasted RAM by reducing the amount of RAM frequently utilized by a process.

SUMMARY OF THE INVENTION

The present invention is an interactive, information logging and processing tool that provides information regarding a process's data structure utilization. This information is used to reduce the working set of a process's dynamically allocated memory. The present invention, referred to as the Actual Working Set (AWS) Determinant, takes a different approach to the virtual memory problem by providing the memory tuner with the necessary information to improve the process itself rather than improving the system so that a given process will operate more efficiently.

The present invention determines which portions of the frequently used, or dynamically-allocated pages, referred to as the process's virtual memory (VM) working set (VWS) are actually used. The actual memory that a process frequently uses is called the process's actual working set (AWS).

The present invention determines the actual working set of a dynamically allocated memory for a given benchmark. The basic approach of the AWS determinator 500 is to observe which data structures cause page faults when the targeted process is severely thrashing. The present invention includes a data logger and a data analyzer. The data logger ensures that a consistent benchmark is achieved in order to obtain the most accurate results, increases the number and granularity of heap page faults for the target process to enable the page fault mechanism of the processor to count the number of times the associated data structure is accessed, log all heap page faults and transactions.

The data analyzer is an interactive, information processing tool that efficiently process the large amounts of data logged by the data logger during a benchmark run. The data analyzer also allows users to interactively explore the processed data, to gain insights into a process's heap AWS. The data analyzer correlates each block of heap memory to a particular C data structure. Then, after the benchmark is completed and the above information is logged and correlated, an information processing step is performed wherein an approximate determination of the targeted process's heap AWS is performed. This section describes the general algorithm for processing the logged and correlated information.

Further features and advantages of the present invention will become more readily apparent from the following detailed description when taken in conjunction with the accompanying drawings.

BRIEF DESCRIPTION OF THE FIGURES

The foregoing and other objects, features and advantages of the present invention should become apparent from the following description when taken in conjunction with the accompanying drawings, in which.

DETAILED DESCRIPTION OF THE PREFERRED EMBODIMENTS

The preferred embodiment of the present invention is now described with reference to the figures, where like reference numbers indicate like elements.

I. Introduction

The present invention is an interactive, information logging and processing tool that provides information regarding a process's data structure utilization. This information is used to reduce the working set of a process's dynamically allocated memory. First, a system overview is provided. Then, a brief review of virtual memory and working set theory is presented. Then, the preferred embodiment of the present invention for identifying the actual working set of a process's dynamically allocated memory is described. Finally, a case study is provided.

II. System Overview

Figure 1:
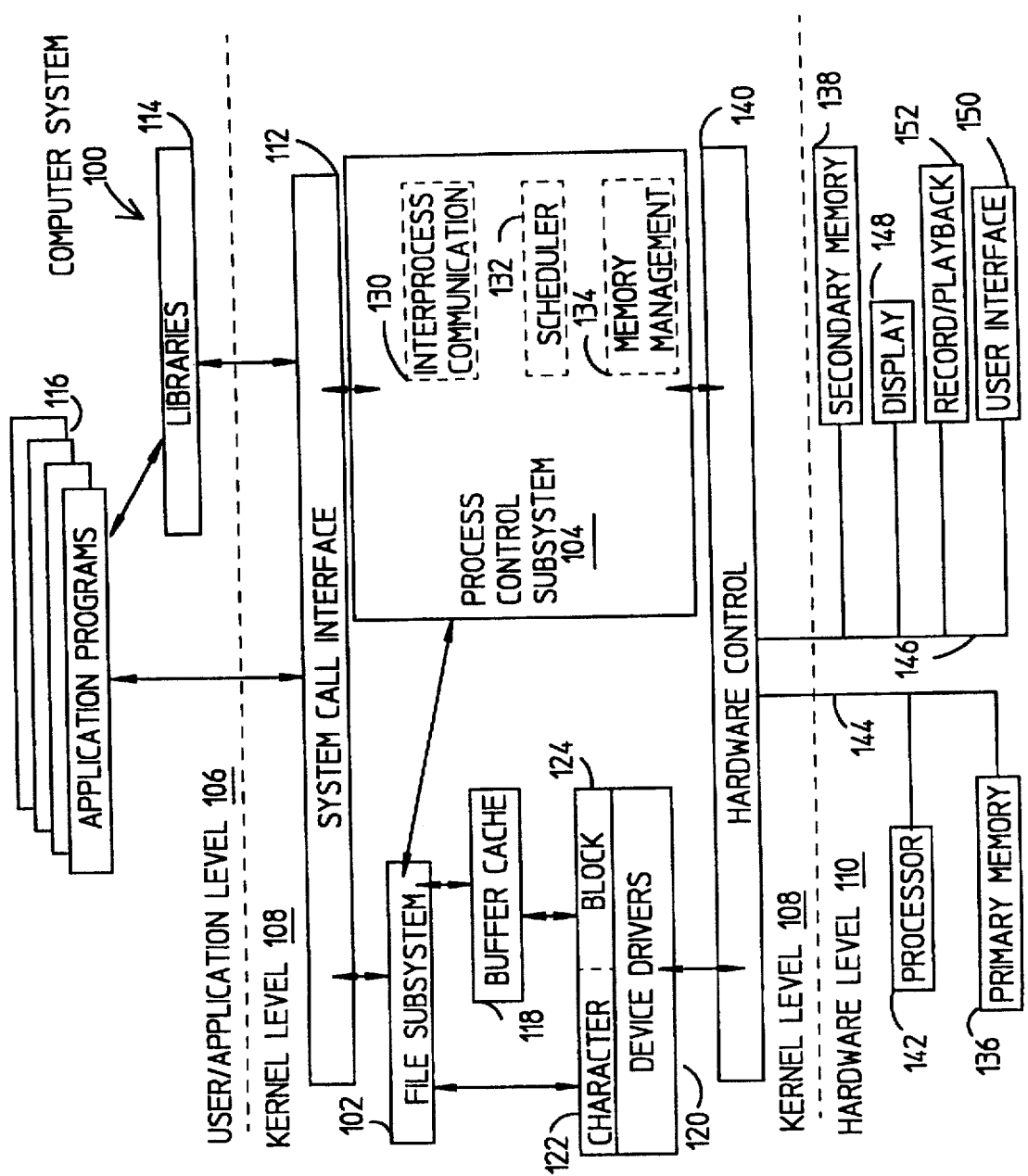
FIG. 1 is a system blocked diagram of the preferred computer environment in which the present invention is implemented.

FIG. 1 is a block diagram of a computer system 100 in which the present invention is preferably implemented. FIG. 1 shows a UNIX system kernel, showing various modules and their relationships to each other. In particular, FIG. 1 shows the file subsystem 102 and the process control subsystem 104, the two major components of the UNIX system kernel 108. FIG. 1 serves as a useful logical view of the UNIX system, although in practice the kernel deviates from the model because some modules interact with the internal operations of others.

FIG. 1 shows three levels of computer system 100: user level 106, kernel level 108, and hardware level 110. The system call interface 112 and library interface 114 represent the border between application programs 116 and the kernel 108. System calls look like ordinary function calls in C programs, and libraries map these function calls to the primitives needed to enter the operating system. However, assembly language programs may be used to invoke system calls directly without a system call library. Programs frequently use other libraries such as the standard I/O library to provide a more sophisticated use of the system calls. The libraries are linked with the programs at compile time and are thus part of the application programs.

FIG. 1 partitions the set of system calls into those that interact with the file subsystem 102 and those that interact with the process control subsystem 104. The file subsystem 102 manages files, allocating file space, administering free space, controlling access to files, and retrieving data for users. Processes interact with file subsystem 102 via a specific set of system calls which are well known in the art.

The file subsystem 102 accesses file data using a buffering mechanism 118 that regulates data flow between the kernel level 108 and secondary storage devices shown as secondary memory 138. The buffering mechanism 118 interacts with block I/O device drivers 124 to initiate data transfer to and from kernel 108. Device drivers are kernel modules that control the operation of peripheral devices. Block I/O devices 124 are random access storage devices or, in the alternative, their device drivers make them appear to be random access storage devices to the rest of system 100. For example, a tape driver may allow kernel 108 to read a tape unit as a random access storage device. The file subsystem 102 also interacts directly with "raw" I/O device drivers without the intervention of buffering mechanism 118. Raw devices, sometimes called character device drivers 122, include all devices that are not block device drivers 124. Most block devices 124 also provide a character device-type interface to allow bypassing kernel 108 buffer cache 118. This is referred to as "raw I/O" to a block device. The sum of character devices 122 and block I/O devices 124 constitute device drivers 120.

The process control subsystem 104 is responsible for interprocess communication 130, memory management 134, and process synchronization and scheduling 132. The file subsystem 102 and the process control subsystem 104 interact when loading a file into memory for execution, the process control subsystem 104 reading executable files into memory before executing them. Process control subsystem 104 implements well known system calls for controlling processes.

The memory management module 134 controls the allocation of memory. If at any time the system does not have enough physical memory for all processes, the kernel 108 moves them between primary memory 136 and secondary memory 138 so that all processes get a fair chance to execute. There are generally two policies for managing memory: swapping and demand paging. The swapper process is sometimes called the scheduler 132, because it "schedules" the allocation of memory for processes and influences the operation of the CPU scheduler.

The scheduler module 132 allocates the CPU to processes. It schedules them to run in turn until they voluntarily relinquish the CPU while awaiting a resource or until the kernel preempts them when their recent run time exceeds a time quantum. The scheduler 132 then chooses the highest priority eligible process to run; the original process will run again when it is the highest priority eligible process available. There are several forms of interprocess communication 130, ranging from asynchronous signaling of events to synchronous transmission of messages between processes.

Finally, hardware control 140 is responsible for handling interrupts and for communicating with hardware level 110. Hardware level 110 comprises a processor 142, a system memory or primary memory 136, and a system bus 144. Primary memory 136 is preferably random access memory (RAM).

A suitable form of processor 142 is the well known RISC System/6000 family of computers produced by IBM. Preferably, processor 142 is a Hewlett Packard PA-RISC System. It should be mentioned, however, that other computers could alternatively be used without diverging from the scope and spirit of the present invention.

Hardware level 110 further comprises a number of peripheral devices attached to an I/O bus 146, including a secondary memory 138, a display device 148, and user interface devices 150, such as a keyboard or mouse-type devices. Secondary memory 138 includes, for example, a hard disk drive and/or a floppy disk drive. In addition, a record/playback device 152 may be used to record user inputs to user interface 150 and display device 148 and then play them back directly through I/O bus 146. Devices such as disks or terminals may interrupt the CPU while a process is executing. If so, the kernel may resume execution of the interrupted process after servicing the interrupt. Interrupts are not serviced by special processes but by special functions in the kernel, called in the context of the currently running process.

A suitable form of kernel 108 is the well known and commonly used UNIX system such as the AT&T UNIX System V, manufactured by AT&T Bell Laboratories, Murray Hill, New Jersey, U.S.A., and the Berkeley Software Distribution (BSD) UNIX system, manufactured by the University of California at Berkeley, Berkeley, Calif., U.S.A.

Variants of these UNIX systems are available, configured for a specific application or machine. Such a configuration includes the preferred implementations Hewlett Packard HP-UX UNIX operating system, available from Hewlett Packard, Fort collins, Colo., U.S.A.

III Virtual Memory and The Conventional Working Set Model

Figure 2:
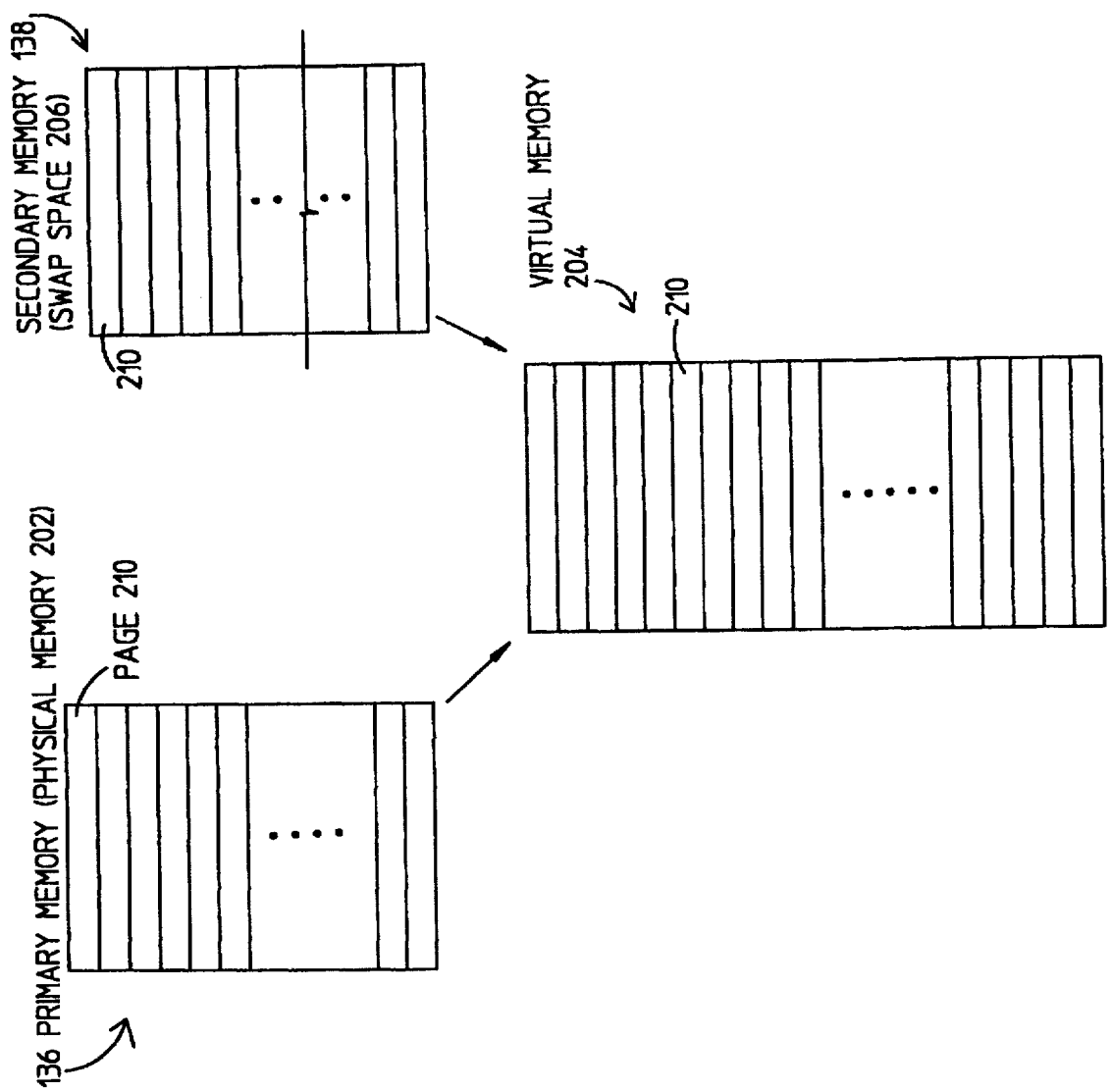
FIG. 2 is a block diagram of the relationship between physical memory and virtual memory.

Computer system 100 is a virtual memory system. FIG. 2 illustrates the relationship between physical memory and virtual memory. Referring to FIG. 2, the physical memory 202 is located in primary memory 136 (RAM 136). A virtual memory (VM) system gives computer processes the illusion that primary memory 136 larger address space than that of physical memory 202. Thus, every process operating in computer system 100 can have a virtual address space 204 that is much larger than the amount of physical memory physical memory 202 in primary memory 136 installed in the system. VM systems give this illusion in a complicated manner.

Both the virtual and the physical address spaces are divided into smaller components or pages 210. Pages 210 are typically a few KBytes in size. Each page is actually located in either RAM (primary memory 136) or in swap space 206 such as secondary memory 138. Memory manager 134 maintains a mapping between each virtual page 208 and it's actual location. Part of this mapping is stored within a special memory management hardware within the CPU 142. Each virtual memory access goes through this memory management hardware. If the memory location's page is located in RAM 136, the correct physical address in physical memory 202 is used for the memory access. If the virtual memory location's page is located in swap space 206, a page fault occurs whereby the page is loaded into RAM 136 before the memory access occurs.

When RAM 136 is full, before a page is brought into RAM, another page must be sent to swap space 206. That is, the presently resident page is "paged out" or "swapped out." The memory manager 134 tries to use a fair policy for determining which page 210 to swap out.

Generally, the time to perform the paging activity described above is long relative to the processing speed of processor 142. The exact time will depend upon various factors, such as the relative speeds of the swap disk and the computer, but will be so lengthy that when a process takes a page fault, it will be suspended until after the page has been brought into RAM 136.

For example, if computer system 100 has a RAM 136 of 64 KBytes of physical memory 202, and each page size is 4 KBytes, then the system has 16 pages of physical memory 202. If a process utilizes 128 KBytes of virtual memory, it will have 32 pages of virtual memory. If the first 16 pages of the process are currently residing in RAM 136 when the process wants to access an address in the 17th page, memory manager 134 takes a page fault on the access in the 17th page. In order to page in the 17th page from the swap space 206, one of the first 16 pages must be swapped out of RAM 136 to swap space 206.

If the process keeps most of its memory accesses within the same 16 pages, it will seldom take a page fault, and as such have excellent performance. However, if the process accesses all 32 pages in a round-robin fashion, it will be suspended most of the time. When this occurs, a process is said to be thrashing. When most active processes are experiencing excessive paging, the system is said to be thrashing. Little visible progress occurs, because the "active" processes are suspended most of the time.

Modern, multi-tasking operating systems, such as the HP-UX operating system of the preferred embodiment, use complicated virtual memory management systems. First, since the kernel is trying to time-slice several processes at the same time, it seldom devotes all of the computer's RAM to one process. The RAM will contain virtual pages from multiple processes. Second, modem kernels employ sophisticated algorithms to reduce the number of page faults. For example, when certain page faults occur, the HP-UX kernel will determine if surrounding pages should be brought in at the same time, in case they will be accessed soon. The kernel also keeps various metrics to determine which pages to swap out (i.e. those unlikely to be brought back in again soon). A kernel never wants to page out memory in a process's working set.

The working set model, introduced by Denning (Denning, P. J., *Communications of the ACM* 11:323–333 (1968); Denning, P. J., *IEEE Transactions on Software Engineering* SE-6:64–84 (1980)), helps understand VM activity in a multi-tasking operating system. The basic idea supporting the working set model is that a process will frequently access a subset of its pages. These pages are called the process's working set. The working set pages must remain resident in order for the process to not thrash.

A process's working set will tend to vary over time. For example, at start-up time, a process's working set may be much larger and much different than the process's steady-state working set. Also, the working set of a menu-driven program may vary as a user chooses different menu items.

If the virtual memory sizes of all processes fit within the available RAM, page faults will only occur when a process accesses a page for the first time. In such cases, system performance will not suffer from thrashing.

Thrashing occurs when the sum of the working sets of all active processes exceeds available RAM. In such cases, in order to page in one process's working set, another process's working set must be paged out.

When a kernel detects that a process is thrashing, the kernel may start taking drastic measures. For example, a kernel may swap out entire processes to increase the number of available pages for the remaining process(es). Of course, when the swapped out processes finally get to run again, all of their working set pages must be brought back in, causing other processes to be swapped out. As discussed above, various improvements to VM paging algorithms have been proposed to increase overall system performance and reduce the likelihood and ill effects of thrashing. However, as discussed above, these improvements do not take the continual growth in memory usage into consideration.

IV. Determining the Actual Working Set (AWS)

A. Working Set Model of Present Invention

In the above discussion, the term "working set" has been used to refer specifically to virtual memory system pages 204. This is primarily due to the traditional focus of virtual memory improvement. Traditionally, the improvements have concentrated on the paging functions performed by memory manager 134. This is most likely the result of the resident processes being produced by manufacturers other than those that produce the operating system. However, the present invention is a system and method directed to improving the process itself rather than improving the memory manager 134 so that a given process will operate more efficiently. To accommodate this different perspective and approach, the traditional definitions used in the industry have to be addressed.

Figure 3:
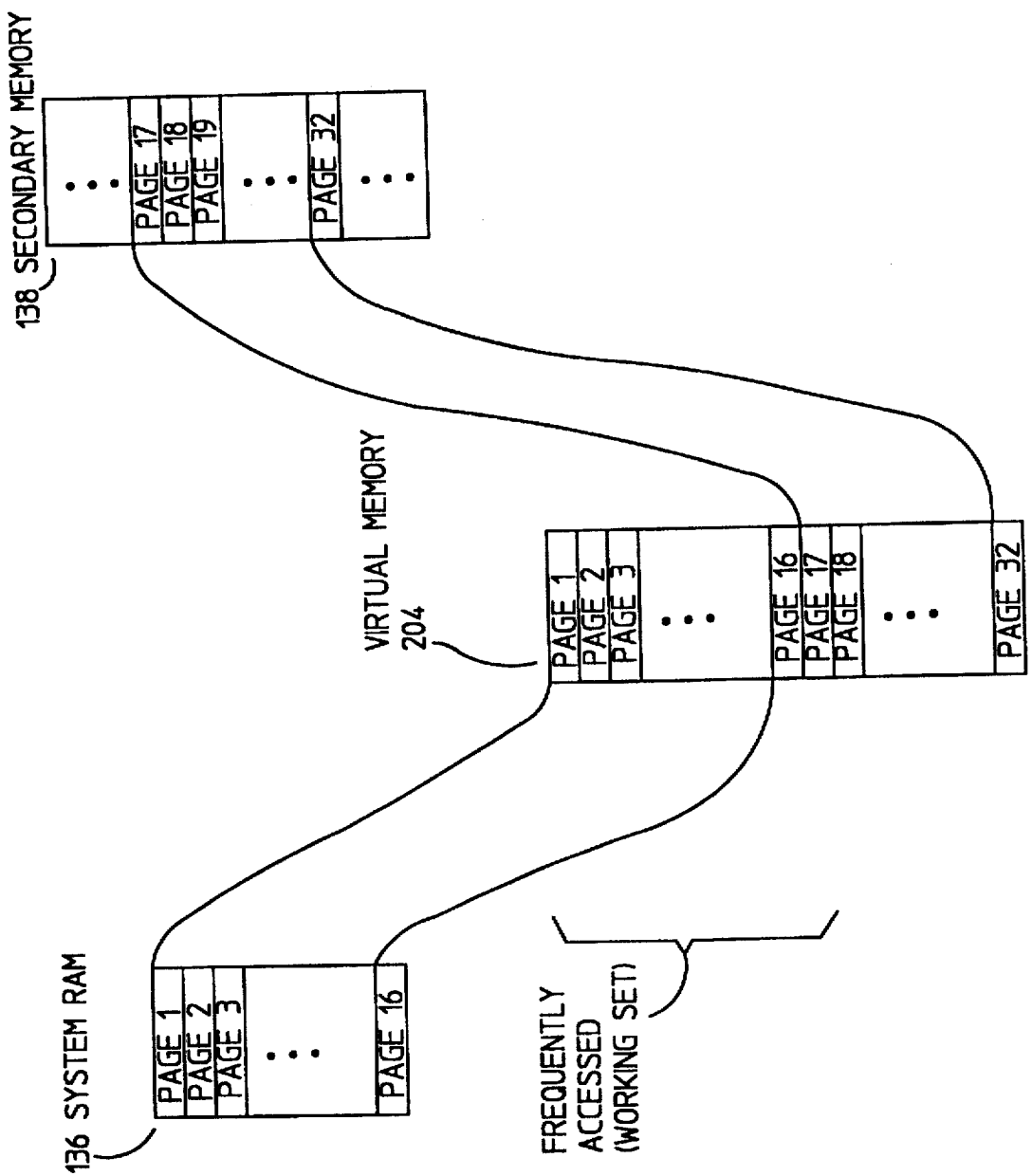
FIG. 3 is an example of a virtual memory system wherein the virtual memory is stored in system RAM and in a secondary memory.

With reference to FIG. 3, it is well understood that tuning non-working-set memory will not improve system performance. For example, referring to the example given above, and with reference to FIG. 3, assume that the working set is 17 pages (for example, pages 1–17) while the entire size of the process is still 32 pages. Again, the system memory 136 only has 16 pages. According to the conventional working set model, computer system 100 will thrash. If a memory tuning effort trimmed away 8 pages not in the working set (for example, pages 25–32), the system 100 will still thrash. This is because none of the eliminated pages were in the working set. Thus, the computer 100 will still thrash even though ¼ of the process's pages were trimmed. If, instead, one of the working set pages is trimmed (for example, page 17), the computer will no longer thrash.

Figure 4:
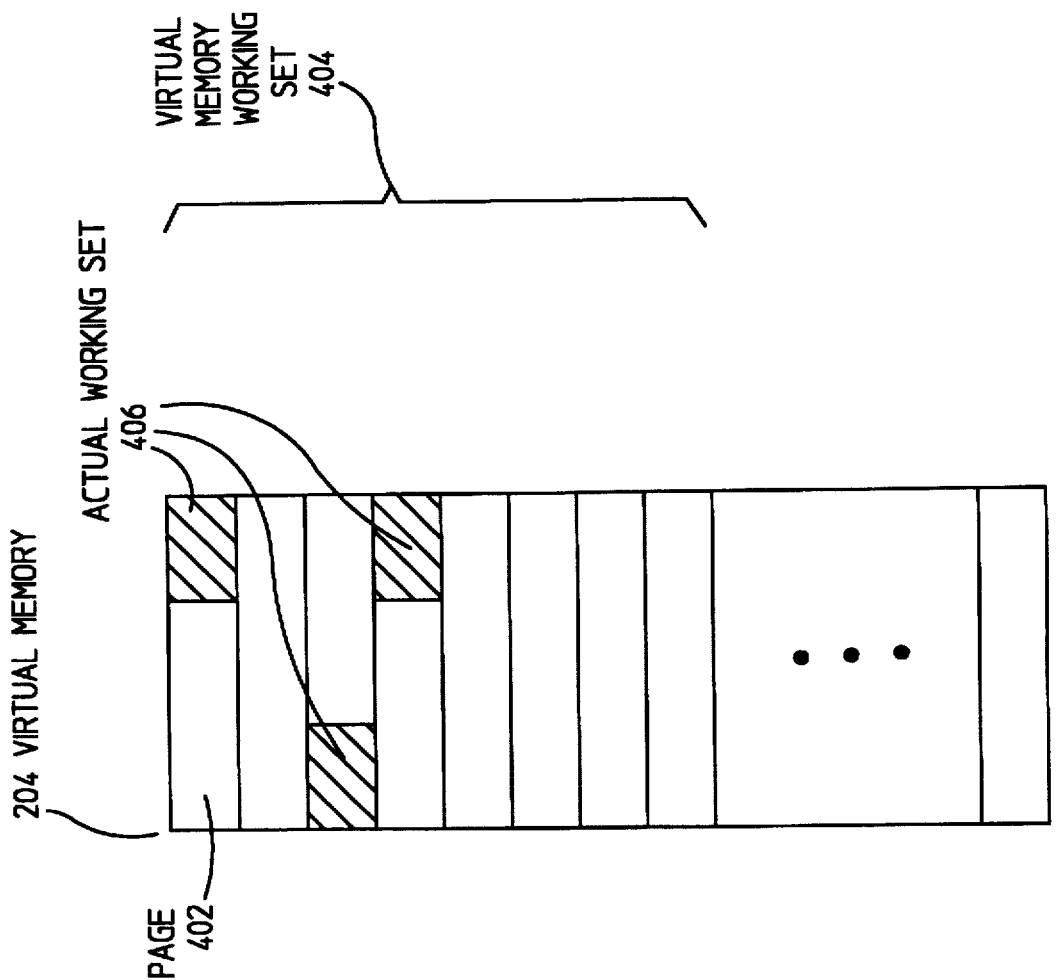
FIG. 4 is a block diagram of a process's virtual working set (VWS) and actual working set (AWS)

Referring to FIG. 4, the definition of a process's working set in accordance with the present invention is now described. From the perspective of memory manager 134, an entire page 402 may be in a process's working set but the program may only be using a small part of that page. Thus, in the present invention, the frequently used, or dynamically-allocated pages are called the process's virtual memory (VM) working set (VWS) 404.

The actual memory that a process frequently uses is called the process's actual working set (AWS) 406. Since memory tuning is typically performed utilizing high-level languages such as C and FORTRAN, the AWS 406 is expressed in terms of procedures and data structures. The VWS 404 (the traditional working set) is expressed in terms of pages. That is, the data structure or code may utilize a small portion 406 of a particular page.

In most situations, AWS 406 will always be smaller than the VWS 404. This is because of differences in granularity. The granularity of the AWS 406 can be measured in bytes, where the VWS 404 is always measured in the size of each page (typically a few KBytes). The present invention utilizes this difference in size to determine which part of the virtual memory working set 404 is included in the actual working set 406.

Referring to the example discussed above with respect to FIG. 3, assume that the VWS 404 is 17 pages and the program's code occupies a single page (for example, the first page), and the program constantly accesses two sets of variables. Assume further that the first set occupies roughly ½ of the second page and the second set is a 16-element linked list where each element's size is 24 bytes, and where each element lives in a different page, beginning with the remaining half of the second page.

In this particular case, the present invention considers only those portions of the VWS 404 that are actually used as the AWS 406. The particular data structures being frequently accessed in this example are relatively very small. The AWS 404 is correspondingly small. This information will enable one to carefully design the program so that the linked list will reside only within the second page. In such a case, the VWS 404 will be just two pages rather than 17 pages. This is closer to the size of the AWS 406.

B. Preferred Memory Tuning Process

Memory tuning is considered to be the process of reducing a process's VWS. If done to a process that contributes to thrashing, thrashing will be reduced or eliminated, depending on how much reduction is done. Typically, memory tuning is generically described as doing one or more of the following types of tasks: (1) improving locality; (2) reducing heap fragmentation; (3) eliminating memory leaks; (4) reducing the size of code and data structures; (5) re-using memory; and (6) scheduling working set growth.

Regarding improving locality, frequently accessed items that are relatively small and live in different pages make the VWS unnecessarily large (as in the simple example above). If possible, allocating the items next to each other will result in a smaller VWS (closer in size to the AWS) and fewer page faults. This rule applies to code as well as to data. For example, grouping frequently-used procedures can reduce the AWS of the code. Some compilers (for example, the compiler associated with HP-UX) help automate this task for code.

Heap fragmentation occurs when memory is allocated and freed in patterns that leave unused holes in the heap. Fragmentation reduces the locality of the AWS, thus needlessly increasing VWS.

A memory leak occurs when a piece of allocated memory is no longer used, but not freed. Memory leaks also reduce the locality of the AWS, thus needlessly increasing the VWS.

The purpose of reducing the size of code and data structures is to shrink the AWS and VWS. For example, if a structure contains multiple 32-bit fields for each of several boolean values, it can use a group of 1-bit fields instead. Sometimes 16-bit integer fields can by substituted for 32-bit integers. Sometimes infrequently used code/data can be pulled out of the midst of frequently used code/data (e.g. the X server's WindowOptRec).

Re-using memory increases system performance. For example, assume that a procedure allocates one or more temporary items each time it is invoked, uses them, and then frees them. By allocating the items once and keeping them around for the future, fragmentation of the heap is reduced (which can improve locality for other heaped data structures).

Scheduling working set growth also improves system performance. For example, the VWS of a process is often very large at start-up time. Starting up several processes at the same time can result in a temporary thrashing situation. By synchronizing the starting of the processes, the sum of the working sets won't get large enough to cause thrashing. This is a system-level example, but similar examples can be found within code.

Figure 5:
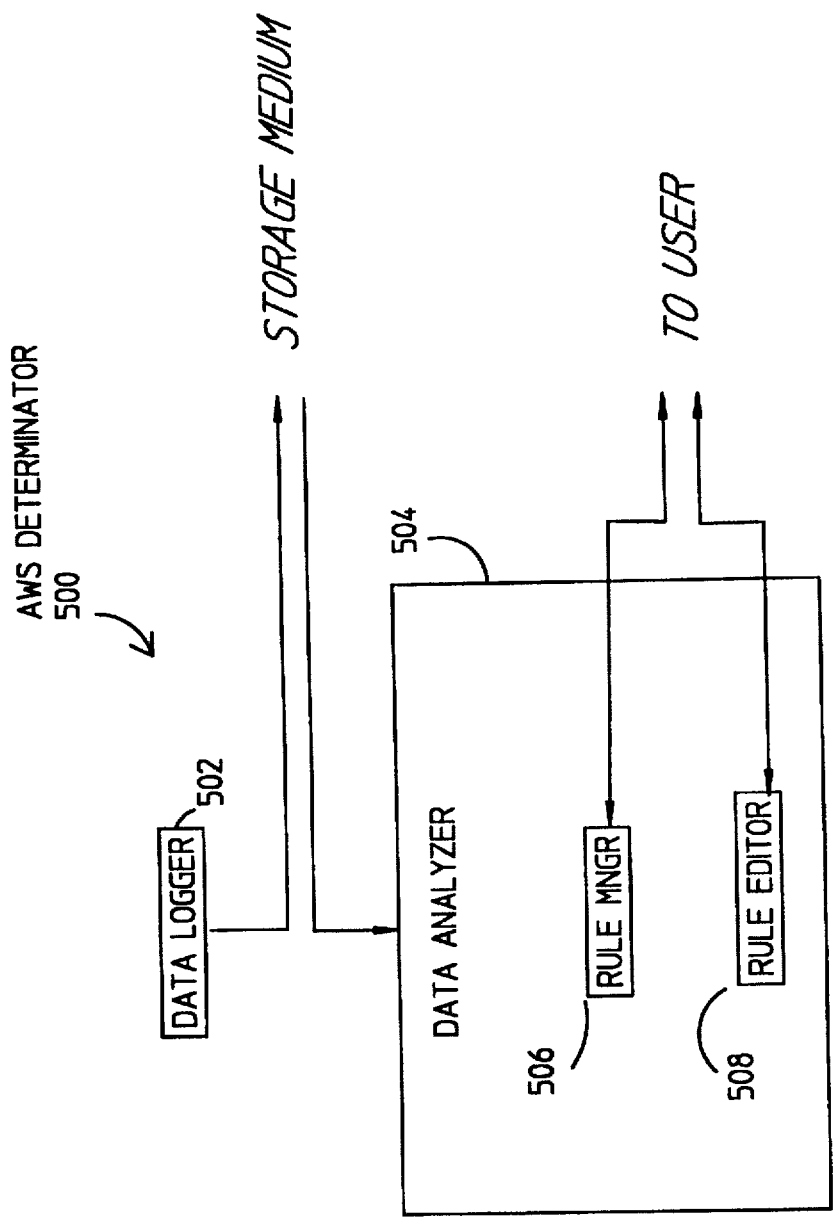
FIG. 5 is a functional block diagram of the actual working set determinator of the present invention.

To effectively achieve the above improvements, the present invention determines a process's AWS, expressed in the high-level language procedures and data structures with which the process is written. As introduced above, the present invention performs data logging and data analysis functions. FIG. 5 is a block diagram of the preferred embodiment of the present invention. Referring to FIG. 5, the present invention, referred to as an AWS determinator 500, includes a dam logger 502 and a data analyzer 504.

V. Actual Working Set

As introduced above, the present invention determines the actual working set of a dynamically allocated memory for a given benchmark. The preferred embodiment of the present invention resides in a UNIX environment. Thus, the dynamically allocated memory is referred to as the process's heap.

The basic approach of the AWS determinator 500 is to observe which data structures cause page faults when the targeted process is severely thrashing. This enables one to determine which data structures are frequently used by a process. FIG. 5 is a block diagram of the AWS determinator 500 of the present invention. Referring now to FIG. 5, AWS determinator 500 includes a data logger 502 and a data analyzer 504. The AWS determinator 500 is specifically discussed in the context of the C programming language, but the AWS determinator method (ADM) can be adapted and applied to any programming language.

A. Data Logger 502

Data logger 502 logs data during benchmark runs for later analysis by data analyzer 504.

Figure 6:
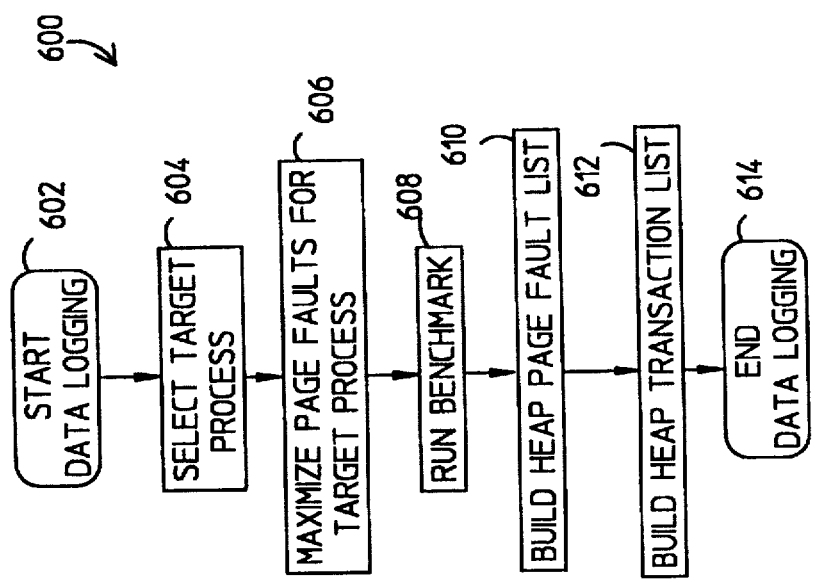
FIG. 6 is a flowchart of the data logging process performed by the data logger of the present invention.

FIG. 6 illustrates a high level flow diagram of the ADM process performed by data logger 502 of the present invention. Referring now to FIG. 6, data logging process 600 consists of the following steps.

The data logging process 600 begins at start data logging 602. As will be described in detail below, data logging process 600 is invoked as part of a user-invoked benchmark run.

Once invoked, the first step performed by data logger 502 is to perform functions that ensure a consistent benchmark is achieved. In order to obtain the most accurate results, data logger 502 must be implemented during multiple benchmark runs wherein the same set of processes are consistently and repeatedly executed, with each performing the same operations during successive benchmark runs. Thus, during step 604, a user interactive approach is utilized to allow the user to select the processes and related parameters for each benchmark run. The greater the repeatability of the benchmark, the greater the accuracy of data analyzer 404 in comparing the results of each benchmark.

In step 606, the number and granularity of heap page faults for the target process is maximized. Granularity refers to the number of data structures per page. This enables the present invention to utilize the page fault mechanism of the processor to count the number of times the associated data structure is accessed. The preferred and alternate methods for achieving this increase in heap page faults is described in detail below. Once the target process is selected and a repeatable benchmark is ensured, the benchmark is invoked in step 608.

In step 610, a time-ordered, time-stamped list of all heap page faults is built and stored in secondary memory 140. This list includes all relevant information for each page fault for future use by data analyzer 504.

In step 612, a time-ordered, time-stamped list of all heap transactions is built. In the UNIX environment of the preferred embodiment, this includes transactions such as calls to malloc(), calloc(), realloc(), and free(). This list includes all relevant information for each transaction, including the size allocated, address allocated, address freed, and procedure call traceback.

Each of these steps is discussed in further detail below.

1. Consistent Benchmark Runs

As introduced above with respect to step 604, to objectively measure the progress of any memory tuning project, a consistently repeatable benchmark is required. The benchmarks of the present invention are different than conventional types of benchmarks. Many benchmarks deal with one or two processes. On the other hand, the benchmarks created in step 604 involve multiple processes which always perform the same operations in the same inter-process order. This minimizes run-to-run page fault variations.

In one preferred embodiment, a recorded user session can serve as a benchmark. Record/playback device 152 records user inputs at display device 148 and user interface 150. The playback tool then replays the session very precisely. All user input and X server events must be well-timed requiring replay playback device 152 to actively monitor client behavior, not just passively send inputs to the X server.

The requirement to maximize page faults makes for a demanding playback environment, and for a poor recording environment. Therefore, benchmark recording must be done when few page faults are occurring, and playback must be done when many page faults are occurring. Record/playback 152, however, accurately playing back a session when the benchmark system was severely thrashing, is configured to playback the session as fast as possible, compressing gaps in user input, and preserving the order of inter-process actions.

2. Maximizing Page Faults

Maximizing the number and granularity of page faults increases the accuracy of AWS determinator 500, which makes its determinations based upon observed page faults. If few page faults are observed, there is little data generated for processing by data analyzer 504. In the preferred embodiment of the present invention, page faults are used as the mechanism to measure the frequency of access of data structures. Page faults were chosen because there are presently-existing kernels which evaluate page fault information to be stored.

Although, as noted above, the best results are achieved when there is a single data structure occupying a page, in many cases, multiple data structures occupy the same page. If such a page is faulted only once, only one structure will be seen and the rest will be hidden. The more times a page is swapped in and out, the higher the probability these hiding structures will be seen.

For example, assume that two frequently accessed data structure types, A and B, are both spread throughout memory (that is, they have poor locality). Further assume that for a particular benchmark, these data structure types occupy the same set of pages. If page faults are not maximized, different scenarios can occur depending upon the access patterns of the benchmark. For example, both structure types will split the faults for their shared pages. Apparently, one of the two will consume all of the faults. Another possibility is that other structures will consume all of the faults.

These scenarios hide data structure types, thereby preventing their occurrence from being logged by data logger 502.

In the preferred embodiment, only one structure occupies each page. If these pages are always swapped out soon after their use, then the number of faults these structures receive will indicate how frequently they are used. For example, assume that two structures, C and D, each receive just one page fault during light paging, but during heavy paging, C receives 2 page faults and D receives 20. Obviously, D is more frequently used than C.

Several approaches can increase the number and granularity of page faults during benchmark run 508. The easiest is to reduce the amount of system RAM 136. The simplest way to do that is to turn off the system and pull out (SIMMs). However, this can be time consuming and probably won't yield enough granularity to zero-in on the optimal amount of page faults. The optimum number of page faults are enough that a relatively accurate AWS-determination can be made, but not so many that the benchmark runs unacceptably long. One preferred approach is to use an enhanced kernel 108 which allows a user to specify, in relatively small increments, the amount of RAM 136 the kernel 108 is programmed to access. This is considered to be within the purview of one skilled in the relevant art.

Another approach is to turn off pre-paging features of memory manager 134. For example, kernel 108 may bring in the surrounding pages of a page which receives a fault, in anticipation that those pages will be accessed soon. Pre-paging is an excellent feature during normal operations, but not during benchmark runs. This is because the purpose of pre-paging is to effectively hide data structure accesses, which is directly contrary to the process of the present invention. This is considered to be within the purview of one skilled in the relevant art.

However, in another preferred embodiment of the present invention, multiple methods are used to result in data logger 502 achieving extremely accurate results. The first portion of this preferred approach is to use a special kernel which targets a particular process. Instead of reducing system RAM, which slows down all processes, such a kernel places just one heap page into the CPU's memory management unit 134. This is done by keying all of a process's pages in RAM while modifying memory management 134 unit 134 to believe that a single page is in RAM. The targeted process will fault every time it accesses a different heap page. Not only will most hiding data structures be found, but the observed frequency of each data structure's usage will be relatively accurate. To maximize performance, the kernel is configured to keep the process's heap pages in RAM, and service each page fault very quickly. This is considered to be within the purview of one skilled in the relevant art.

The second portion of the preferred approach, which may also be utilized separately, is to direct page faults at specific data structures. For example, in the UNIX environment in which the preferred embodiment is implemented, the malloc library may be modified so that no two data structures ever share the same page. This modification of malloc is considered to be well known to one skilled in the relevant art. When used in conjunction with the enhanced kernel described above, the accuracy of the ADM becomes nearly perfect.

3. Logging Page Faults

Figure 7:
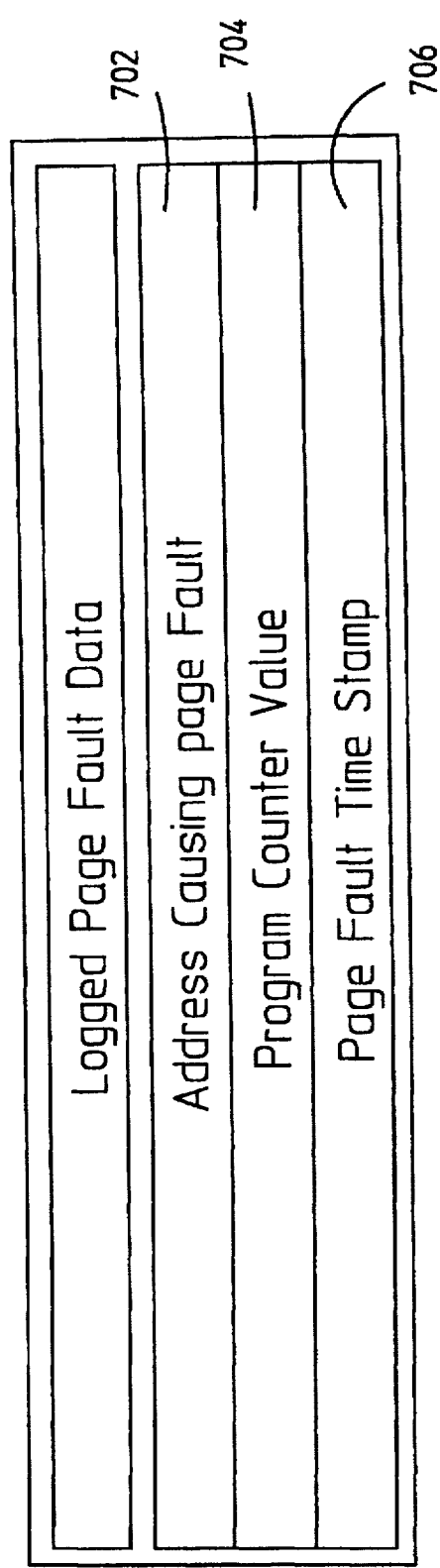
FIG. 7 is a table of the page fault data which is logged during a typical benchmark run.

As discussed above, the ADM observes page faults when a process is severely thrashing. For each page fault, data logger 502 logs information about all heap page faults in a time-ordered, time-stamped list. Referring to FIG. 7, the following information is logged in step 610. First, the address that caused the page fault 702 is logged. This is the address that was being accessed when the page fault occurred. As discussed elsewhere in this application, the present invention logs and analyzes data structures. However, should the present invention be directed towards program code, then the program counter would be stored. In addition, the program counter value 704 and page fault time stamp 702 would be stored. This is the address of the procedure that caused the page fault.

In the preferred embodiment, kernel 108 is an HP-UX kernel. The HP-UX kernel provides the above information in a special measurement information buffer. In addition, a data logging tool already existed in kernel 108. Modification to this pre-existing logging feature of kernel 108 was necessary, and was considered to be under the purview of one skilled in the art. It should be noted that this logging tool is relatively small and unobtrusive.

4. Logging Heap Transactions

As discussed above, in step 612, a time-ordered, time-stamped list of heap transactions is built. As discussed above, the preferred embodiment of kernel 108 is a UNIX kernel. In step 612, data logger 502 logs all information relating to each call to the dynamically allocating library of the C programming language. This includes calls to malloc (), calloc(), realloc(), and free(). However, as one skilled in the relevant art would find apparent, the present invention may be configured to log calls to any dynamically allocating library of the desired high level language.

Figure 8:
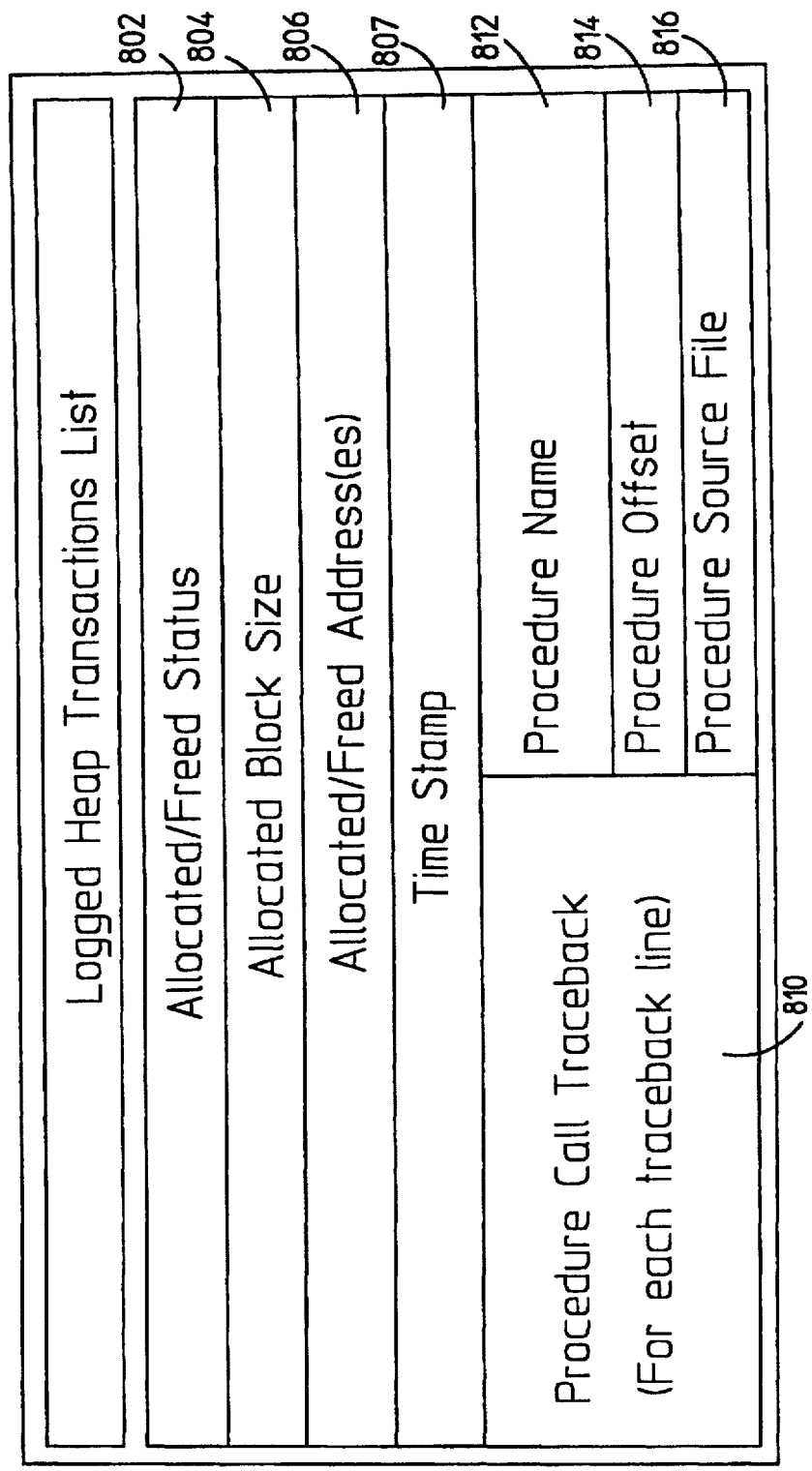
FIG. 8 is a table of the heap transactions data which is logged during a typical benchmark run.

Referring to FIG. 8, the information logged for each heap transaction includes the following. The heap transaction information includes an allocated/freed status 802. This status indicates whether the memory was allocated or freed. The heap transaction information also includes the allocated block size 804. Also included in the logged heap transaction information is the allocated/freed addresses 806 and the time stamp 807. Finally, a procedure call traceback data 810 is also logged. This includes the following information for each traceback line. The procedure's name 812, and the procedure offset 814 from the beginning of the procedure to differentiate one procedure call from another; and the procedure's source file 816.

The first difficulties were: 1) quickly and accurately determining the procedure transaction traceback; and 2) designing a format for quickly and concisely logging the per-transaction information. The first attempt at logging information for X server startup (i.e. no clients running) took roughly 30 minutes to log the approximately 17 megabytes of information. The first attempt used a generic HP-UX traceback utility which produced full ASCII strings for the entire traceback, accounting for most of the time and space.

In the preferred embodiment, processor 142 is an Hewlett-Packard PA-RISC system and kernel 108 is an HP-UX UNIX operating system. Producing an accurate traceback on HP UX is difficult, due to the shared libraries of PA-RISC. Thus, in the preferred embodiment, a custom utility which returned an array of addresses is used. Correlating these addresses with procedure names from the program's symbol table was deferred till post-processing (which proved more efficient and less obtrusive during benchmark runs). The final logging format was a very tight, binary format. The final solution was 2-orders of magnitude more space efficient, and 3-orders of magnitude more time efficient than the first attempt.

Next, it was important to modify the libc shared library, which contained the version of malloc() most programs use.

Time stamping the heap transaction information is achieved by passing the heap data to the kernel 108. The kernel time-stamps the data and merges it with the page fault data in its special measurement interface buffer described above. This allows one data logging tool to log all information.

B. Data Analyzer 504

Figure 9:
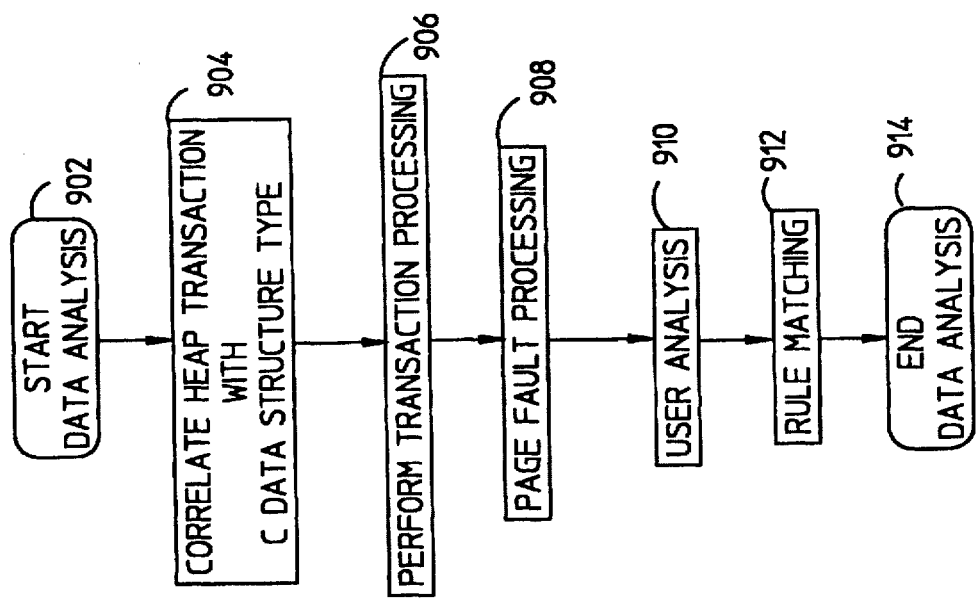
FIG. 9 is a flowchart of the high-level data analysis processes performed by the data analyzer of the present invention.

Data analyzer 504 is an interactive, information processing tool that efficiently process the large amounts of data logged by data logger 502 during a benchmark run. Data analyzer 504 also allows users to interactively explore the processed dam, to gain insights into a process's heap AWS. FIG. 9 is a flowchart of the main processes performed by data analyzer 504.

1. Correlating Heap Transactions to C Data Structure Types

Once the above information is logged by data logger 502 for each heap transaction, data analyzer 504 correlates each block of heap memory to a particular C data structure type in step 904. As will be described in detail below, this correlation is accomplished by comparing the logged information against a set of rules. The correlation step 904 is now described with reference to an example data structure type in a sample X server. The sample X server is a sample server for workstation users having device dependent drivers. Sample X server is available from X Consortium, Inc., Cambridge, Mass., U.S.A.

Figure 10:
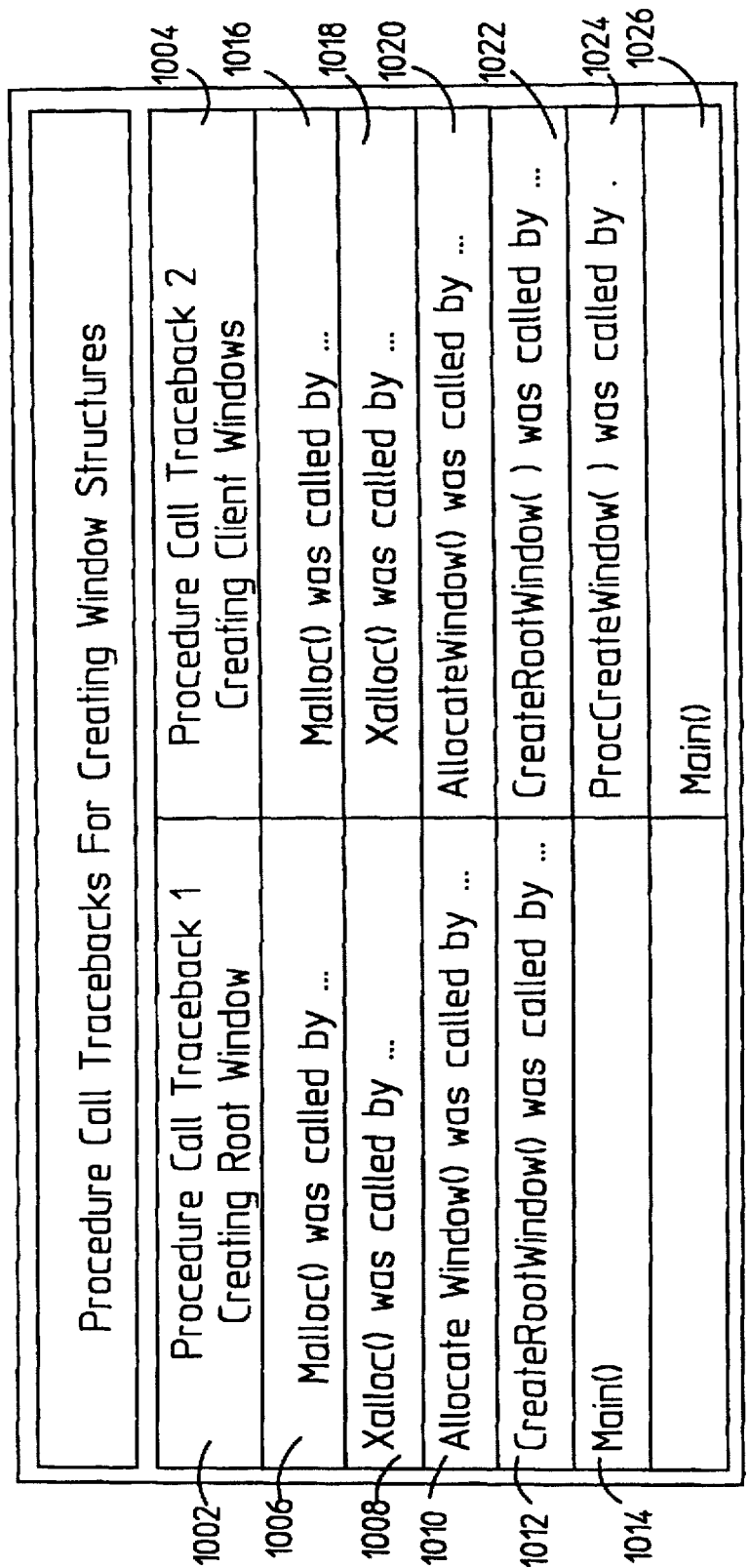
FIG. 10 is a table of the procedure call tracebacks for creating window structures.

FIG. 10 illustrates the procedure call tracebacks for creating a window structure. Referring to FIG. 10, one of the most important data structure types in the sample X server is the WindowRec (or simply the Window) structure. While the size of Window structures can vary in a multi-screen X server, there are only two unique procedure call tracebacks used to create Window structures. Referring to FIG. 10, they are the procedure call traceback 1002 for creating the root window and the procedure call traceback 1004 for creating client windows. It should be noted that often, each C data structure type will have just one unique allocating traceback, simpler than the one presented in this example.

The procedure call traceback 1002 is shown in the left column of FIG. 10. To create the root window, the following procedure calls were made. The Malloc() procedure call 1006 was called by the Xalloc() procedure call 1008. The Xalloc() procedure call 1008 was called by the AllocateWindow() procedure call 1010. The AllocateWindow() procedure call 1010 was called by the CreateRootWindow() procedure call 1012. The CreateRootWindow() procedure call 1012 was called by the Main() procedure call 1014.

The procedure call traceback 1004 is shown in the right column of FIG. 10. To create client windows, the following procedure calls were made. The Malloc() procedure call 1016 was called by the Xalloc() procedure call 1018. The Xalloc() procedure call 1018 was called by the AllocateWindow() procedure call 1020. The AllocateWindow() procedure call 1020 was called by the CreateWindow() procedure call 1022. The CreateWindow() procedure call 1022 was called by the ProCreateWindow() procedure call 1024. The ProCreateWindow() procedure call 1024 was called by the Main() procedure call 1024.

Referring to FIG. 10, it is clear that the first three procedures in each traceback are the same. That is, procedure calls 1006, 1008 and 1010 are the same as procedure calls 1016, 1018 and 1020, respectively. This is not unusual. In fact, the first two and the last two procedures are often identical for most X server dam structure types. Thus, the procedures in the middle of the traceback are generally more interesting. In this example, AllocateWindow() is in both tracebacks. Since AllocateWindow() only makes one call to Xalloc(), any heap transaction with AllocateWindow() in the traceback is a Window structure.

In the present invention, the preferred manner in which to identify C data structure types is with one or more rules. Rules are specifications of what the data structure type's allocating or freeing transactions look like. Rules are well known in the art and are analogous to "regular expressions." A set of rules is given a name (typically, the structure type name). These rules are compared with each heap transaction. They are the selection criteria that the data analyzer 504 uses to determine which transactions correspond to which C data structure types. When a rule matches a transaction, the corresponding heap block is identified. The data analyzer 504 implements this approach in an interactive fashion, through the rule manager 506 and rule editor 508.

The rules used in the preferred embodiment of the present invention allow each data structure to be identified more than once. Sometimes it is useful to have a hierarchy of data structure type names. For example, pixmaps are used for a variety of purposes in the sample X server (e.g. backing store, tiles, stipples). Therefore, one set of rules can identify all pixmaps, and other sets of rules can identify particular types of pixmaps.

For programs with large numbers of structure types, rule creation can be time consuming. To facilitate rule creation, data analyzer 504 uses rule manager 506 allows users to interactively manage sets of rules. Addition rule editor 508 includes a dialogue that allows users to interactively create and edit rules. Other well known features are utilized in rule manager 506 and rule editor 508 to facilitate rule creation and management. For example, each portion of a rule can be wild-carded. This increases the power of each rule, which decreases rule creation time. In addition, rule files can be read and written to preserve rules between data analysis sessions. Heap transactions can be viewed in a number of ways in the rule editor 508. For example, users can start the rule editor with the initial values being set to those of the viewed transaction.

The wild-card features introduced above is described in further detail below. Using the Window structure example shown in FIG. 10, the traceback for each allocating transaction contained the AllocateWindow() procedure. Further, the AllocateWindow() procedure 1010,1020 only made one call to Xalloc() 1008,1018 to create a Window. Thus, an obvious rule identifying the Window structures is any transaction for which the traceback contains the word AllocateWindow. Notice that no other portion of a transaction is specified in this rule—all values are considered to match all wild-carded portions of a rule.

In the preferred embodiment, if some unidentified structure is causing many page faults, a menu selection pops-up the rule editor dialogue and with initial values set to that of the structure's allocating transaction. The initial rule values can be edited (e.g. to make it more general) and given a name (typically the actual C dam structure type name). When the rule is saved, it is compared with all transactions to identify all matching memory blocks. The user can now examine information for every data structure of that type.

2. Information Processing

After the benchmark is completed and the above information is logged and correlated, an information processing step is performed wherein an approximate determination of the targeted process's heap AWS is performed. This section describes the general algorithm for processing the logged and correlated information.

First, in step 906, the transaction data is processed to place it in a form satiable for data analysis. The transaction processing in step 906 is described in further detail below with reference to FIG. 11.

Next, a series of functions, referred to generally as page fault processing, are performed in step 908. In step 908, the page fault data is read in and correlated with the heap transaction data. Links are setup between corresponding data structures and page faults. This is described in detail below with reference to FIG. 12.

a. Transaction Processing—Step 906

Figure 11:
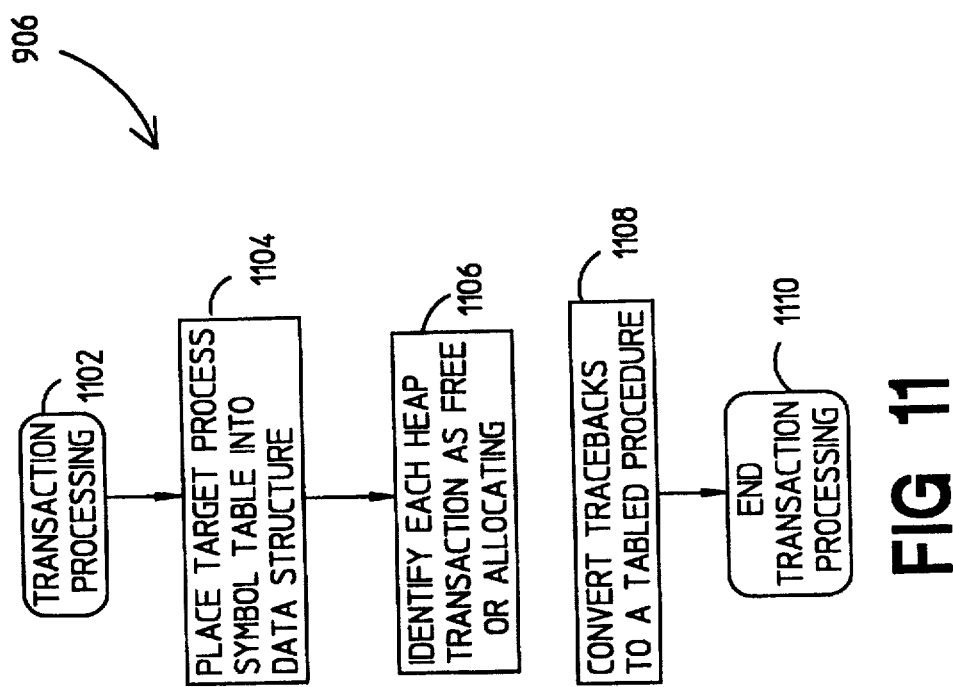
FIG. 11 is a flowchart of the transaction processing performed by the data analyzer of the present invention.

The processing performed on the heap transaction data is now described with reference to FIG. 11. First, in step 1104, the targeted process's symbol table is read into a convenient data structure (for example, a hash table). Then the heap transaction data can be read and processed.

Next, in step 1106, each heap transaction is identified as an allocating or freeing transaction. The allocated address of each allocating transaction is hashed. This simplifies the software associated with step 908 that matches allocating and freeing transactions. When a matching set of transactions is found, they are cross-linked.

In step 1108, each line of a traceback is converted into a procedure name, file name, and offset within the procedure. The procedure name is required since each line of a traceback is logged simply as an address. The offset is the number of bytes from the start of the procedure. Since each line of a traceback can be seen multiple times, each line is put into a hash table. This hash table generates a unique, 32-bit key value for each unique traceback line. This reduces the amount of data the data analyzer 504 stores as well as the time it takes to do further processing (step 1206).

In step 1108, each traceback is stored as an array of traceback line keys. As with traceback lines, each traceback is also put into a hash table, and a unique key value is generated for each unique traceback. Each transaction stores the unique key for its traceback.

b. Page Fault Processing—Step 908

Figure 12:
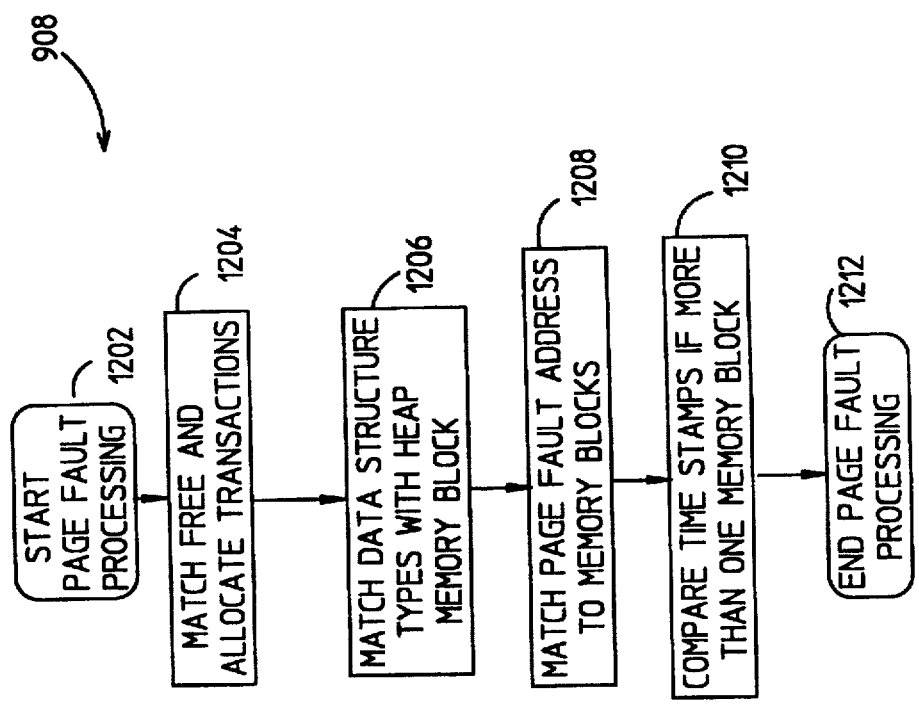
FIG. 12 is a flowchart of the page fault processing performed by the data analyzer of the present invention.

As discussed above with reference to FIG. 9, after the transaction data is processed and placed into a form suitable for data analysis, page fault processing may then occur in step 908. FIG. 12 is a flowchart of the steps performed during page fault processing step 908. Referring now to FIG. 12, the preferred page fault processing is described below.

In step 1204, each freeing transaction is matched with its corresponding allocating transaction. This identifies the period of time that the heap block was allocated. If no freeing transaction was logged that matches an allocating transaction, the corresponding memory block is a potential memory leak.

Next, each page fault is correlated with the C data structure that caused it. First, in step 1206, the data structure types are matched with the attached heap memory block using rules. Then, in step 1208, the address of the page fault is matched with all corresponding memory blocks over time. If there is greater than one match, then in step 1210, a time stamp comparison is made to determine which data structure caused the page fault. Thus, by comparing the address that caused each fault with the heap information until it is matched with a particular data structure. The page fault process ends at block 1212.

For example, assume that a particular fault occurs 13 minutes into a benchmark run. The address that caused the fault (0X400AB340) falls within the address range of 3 different pairs of heap transactions. After comparing time stamps, it becomes obvious which pair corresponds to the page fault.

All of this newly cross-referenced information can now be analyzed to gain insights about the AWS.

c. User Analysis

Once page fault processing step 908 is completed, the data can be analyzed in many different ways. The data can be sorted (e.g. by number of page faults, by structure sizes) with data analysis displaying histograms. Each histogram line can be selected, and additional information can be requested. "Memory map" graphs can be displayed, which graphically show the size and placement of selected data structures, to show locality.

d. Rule Making

Rules are matched with transactions whenever they are created or read from a rule file. The structure of the transaction database makes rule matching straight-forward.

First, each line of a rule is compared with each traceback line in the transaction database. If matches are found the unique key(s) are recorded (note: because of wild-cards, a rule line may match more than one traceback line). If any rule lines don't find a match, the entire rule won't match any transactions and processing stops for this rule.

After rule lines have been matched, the traceback rule is compared with each unique traceback from the transaction database. The unique key is recorded for each matching traceback. Then, the transactions themselves are compared with the full rule (matching tracebacks is a simple integer compare of the 32-bit keys). Cross-links are set up between rules and matching transactions, which improves interactive performance of data analysis.

As described above, in a preferred embodiment of the present invention, the data structures of a process are logged and analyzed. However, as should be apparent to one skilled in the relevant art, the AWS determinator 500 of the present invention may be configured to log and analyze other characteristics of a process such as the process's code and global variables.

In a preferred embodiment of the present invention, the data analyzer 504 performs its functions after the benchmark run is completed and the data logger has stored the necessary information. However, as should be apparent to one skilled in the relevant art, data analyzer 504 may reside in another processor and operate in real time with data logger 502. For example, in an embodiment wherein the computer system 100 is connected to a network, the data logged by data logger 502 may be stored in storage devices in communication with computer system 100 via the network. Also, when the computer system 100 is connected to a network, the data analyzer 504 may reside in a separate computer system performing data analysis functions after the benchmark run is completed.

In the previous description, the present invention has been described with reference to the C language and the HP-UX UNIX environment. However, as one skilled in the relevant art would find apparent, the present invention can work with any high-level programming language such as FORTRAN. In addition, the present invention can operate in any operating system such as Windows/NT, VMS, Open VMS, T/20, et cetera. The actual working set determinator 500, including data logger 502 and data analyzer 504, preferably represents computer programs and/or libraries which reside (during run-time) in primary memory 136, and which are executed by the processors in computer system 100, such as processor 142. The data logged by data logger 502 may be stored in secondary memory 138. Also, the computer programs/libraries associated with the AWS determinator 500 may be stored in a floppy disk or some other removable storage medium.

It should also be understood that embodiments of the present invention can be implemented in hardware, software, or a combination thereof. In such embodiments, the various components and steps would be implemented in hardware and/or software to perform the functions of the present invention. Any presently-available or future developed computer software language and/or hardware components can be employed in embodiments of the present invention.

VI. Case Study: Memory Tuning HP's X Server Using AWS Determinator

A description of the implementation of AWS determinator 500 to memory tune Hewlett Packard's X server follows.

The sample X server used in this case study is the sample X server, 5th Release, available from X Consortium, Cambridge, Massachusetts. The Consortium staff had done some prior memory tuning without the use of the present invention. Despite this work, there was still room for improvement.

A. Windows

Three types of improvements were made for window-related structures. First, the locality of the window tree was improved with the use of a general-purpose library called ChunkAlloc. Second, the size of the window private structures was reduced. Finally, the locality of the WindowOptRec data structures was also improved using ChunkAlloc.

1. Window Locality

As illustrated in previous sections, each window structure is individually allocated. Windows are linked together according to their hierarchical (i.e. tree) relationships. The window tree is walked relatively frequently. Intuition suggests that window structures will have poor locality with each other, which will increase the X server's VWS, and cause unnecessary page faults. AWS determinator 500 confirmed this intuition. ADM benchmark runs showed that window structures are frequently accessed (i.e. in the AWS) and have poor locality (i.e. increasing the VWS). The X server was charged to allocate windows in groups (called chunks) using a library called ChunkAlloc.

B. Size Reductions

In addition to newly improved locality, the AWS determinator 500 showed that the window structures were rather large. This meant that relatively few windows fit into each page. Thus, each window tree traversal would still access a large number of pages.

HP had recently made major improvements in its X server performance. An entirely new generation of DDX code had been developed. Unfortunately, the new DDX code still used private structures from a previous generation. Only a few fields were used from those old privates, leaving considerable memory wasted for each window.

After private structure restructuring, the newer DDX code used approximately 200 fewer bytes per window. When combined with ChunkAlloc, windows were now local and small, which resulted in many fewer page faults.

C. WindowOpt Locality

The core X11 protocol specifies a number of attributes for each window. During the R4 effort, the Consortium staff noticed that most windows didn't use several of the attributes. This led them to split the window structure. They created a new, WindowOpt, structure, which is allocated if a window uses the less-used attributes.

The AWS determinator 500 analysis showed that a sizable percentage of the windows (at least for the particular benchmark) used WindowOpt structures. The AWS determinator 500 also showed locality problems, similar to those seen with the main window structure. Therefore, a ChunkAlloc library was used to improve locality.

D. Resource Locality

Given the client-server nature of X11, clients don't directly reference server-internal data structures. Instead, clients use resource identifiers to operate on these structures (a.k.a. resources). The server maintains a resource database, which contains a mapping between resource identifiers and server-internal data structures.

For each resource in the database, a small, 16-byte data structure is allocated. AWS determinator 500 showed that these small structures were frequently processed and caused many page faults. Looking at the memory map of these structures showed a definite locality problem. Once again, ChunkAlloc was used. Locality was increased and page faults were reduced.

E. Fonts

Using the invention, it was revealed that the code which opens bitmap fonts was very wasteful. Each time a bitmap font was opened, one large structure (approximately 80 KBytes) and many small structures were allocated, used, and then freed. Because other operations occurred between the time each bitmap font was opened, these transient structures fragmented the heap, decreasing the locality of other AWS structures.

Investigating what the bitmap font code was trying to do revealed that the large data structure was large by accident—it only needed to be a few KBytes, not 80.

A small utility library was created, allowing the smaller transient structures to be allocated from larger, less-transient chunks of memory. This further reduced fragmentation. Using this same library for non-transient font structures improved locality further.

VII. Conclusion

While the invention has been particularly shown and described with reference to a preferred embodiment thereof, it will be understood by those skilled in the art that various changes in form and details may be made therein without departing from the spirit and scope of the invention.

What is claimed is:

1. A system for determining the actual working set of a process in a virtual memory computer system, comprising:
    a data logger configured to run consistent benchmarks during which said data logger logs dynamically allocated transactions and virtual memory page fault information wherein said data logger includes means for compiling a time-ordered, time-stamped page fault list and a time-ordered, time-stamped page transaction list;
    a data analyzer, coupled to said data logger, configured to correlate each block of a dynamically allocated memory to a particular high level language data structure wherein said data analyzer includes means for correlating said page fault list and page transaction list, wherein page transactions are associated with data structure types, by comparing said page transactions with a set of rules, each of said rules defining a sequence of allocating and freeing transactions for one of said data structures types, and
    transaction processing means for identifying allocating transactions and freeing transactions; and
    fault processing means for correlating said page fault list and page transaction list and forming links between page faults and associated high level data structures.

2. A system for determining the actual working set of a process in a virtual memory computer system, comprising:
    a data logger configured to run consistent bench mark during which said data logger logs dynamically allocated transactions and virtual memory page fault information; and
    a data analyzer, coupled to said data logger, configured to correlate each block of a dynamically allocated memory to a particular high level language structure wherein said data analyzer includes means for correlating code procedures, which caused each of said faults, to said high level data structures.

3. A system for determining the actual working set of a process in a virtual memory computer system, comprising:
    a data logger configured to run consistent bench mark during which said data logger logs dynamically allocated transactions and virtual memory page fault information; and
    a data analyzer, coupled to said data logger, configured to correlate each block of a dynamically allocated memory to a particular high level language data structure;
    wherein the virtual memory computer system includes an operating system kernel and physical memory, wherein said operating system kernel maintains only one virtual page of the process in said physical memory, thereby causing a fault each time a virtual page is attempted to be accessed other than said one virtual page.

4. A system for determining the actual working set of a process in a virtual memory computer system, comprising:
    a data logger configured to run consistent bench mark during which said data logger logs dynamically allocated transactions and virtual memory page fault information; and a data analyzer, coupled to said data logger, configured to correlate each block of a dynamically allocated memory to a particular high level language data structure wherein said data analyzer includes a rule manager for interactively managing a set of rules and a rule editor for interactively creating and editing rules.

5. A method for determining the actual working set of a process having dynamically allocated data structures in a virtual memory system for enhanced memory tuning, the method comprising the steps of:

inducing a substantially high page fault rate for the process;

running a substantially repeatable benchmark on the process;

logging process information, including compiling a time-ordered, time-stamped page fault list and a time-ordered, time-stamped page transaction list; and analyzing said process information data to correlate blocks of heap memory with said data structures, including correlating said process information, wherein page transactions are associated with data structures types, by comparing said transactions with a set of rules, each of said rules defining a sequence of allocating and freeing transactions for one of said data structures types, and processing said process and correlated information to determine the actual working set of the process, including transaction processing, including identifying allocating transactions and freeing transactions, and fault processing, including correlating said page fault list and page transaction list and forming links between said blocks of heap memory and the data structures.

6. The method of claim 5, wherein the virtual memory system has a plurality of virtual memory pages, and wherein said inducing step is achieved by having only one of the data structures on each of said virtual pages.

7. The method of claim 5, wherein the virtual memory system includes an operating system kernel and physical memory, and wherein said inducing step is achieved by said operating system kernel by maintaining only one virtual page of the process in said physical memory, thereby causing a fault each time a virtual page is attempted to be accessed other than said one virtual page.

8. The method of claim 5, wherein said page transaction list includes memory status data indicating whether a block of memory is allocated and whether said block is freed, block size data, block address data, a time-stamp, and procedure call traceback data, including a procedure name, a procedure offset, and a procedure source file name.

9. The method of claim 5, wherein said fault processing includes correlating code procedures, which caused each of said faults, to the data structures.

10. The method of claim 5, wherein said page fault list includes a page fault address and a page fault time-stamp.

11. The method of claim 5, wherein said process information includes data pertaining to global variables of the process, and wherein said fault processing includes correlating accesses to said global variables to said page faults.

12. The method of claim 5, wherein said process information includes data pertaining to program code procedures of the process, and wherein said fault processing includes correlating calls to said procedures to said faults.

13. The method of claim 5, wherein said process information includes data pertaining to statically allocated objects of the process, and wherein said fault processing includes correlating assesses to said objects to said page faults.

14. The method of claim 5, wherein said transaction processing step includes reading a symbol table of the process into a hash table.

15. The method of claim 5, further comprising the step of displaying the linked data of said fault processing step.

16. The method of claim 5, wherein fault processing includes matching each of said allocating transactions with one of said freeing transactions and correlating each of said page faults to one of the data structures.

17. The method of claim 5, wherein fault processing step includes indicating a potential memory leak, if one of said freeing transactions does not match one of said allocating transactions.

* * * * *

UNITED STATES PATENT AND TRADEMARK OFFICE
CERTIFICATE OF CORRECTION

PATENT NO. : 5,721,917
DATED : February 24, 1998
INVENTOR(S) : Ian A. Elliot, David R. Lechtenberg, James M. Stearns and Alan D. Ward It is certified that error appears in the above-identified patent and that said Letters Patent is hereby corrected as shown below:

<u>Column 18,</u>
Line 36: "bench mark" should read -- benchmarks --
Line 45: "bench mark" should read -- benchmarks --
Line 64: "bench mark" should read -- benchmarks --

Signed and Sealed this

Twenty-first Day of August, 2001

Attest:

*Nicholas P. Godici*

NICHOLAS P. GODICI
*Attesting Officer*     *Acting Director of the United States Patent and Trademark Office*